United States Patent
Johnson et al.

(10) Patent No.: US 9,072,364 B2
(45) Date of Patent: Jul. 7, 2015

(54) ITEM HOLDER

(75) Inventors: Ronald L. Johnson, San Jose, CA (US);
Idriss Mansouri-Chafik Ruiz, San Jose, CA (US); Yugen Patrick Lockhart, Palo Alto, CA (US)

(73) Assignee: WAGIC, INC., San Jose, CA (US)

( * ) Notice: Subject to any disclaimer, the term of this patent is extended or adjusted under 35 U.S.C. 154(b) by 281 days.

(21) Appl. No.: 12/713,024

(22) Filed: Feb. 25, 2010

(65) Prior Publication Data

US 2010/0219312 A1  Sep. 2, 2010

Related U.S. Application Data (60) Provisional application No. 61/156,340, filed on Feb. 27, 2009.

(51) Int. Cl.
*F16B 45/00* (2006.01)
*F16M 13/02* (2006.01)
*A45F 5/02* (2006.01)

(52) U.S. Cl.
CPC .. *A45F 5/02* (2013.01); *Y10T 24/13* (2015.01); *Y10T 29/49826* (2015.01); *A45F 5/021* (2013.01)

(58) Field of Classification Search
CPC ............ A45F 5/00; A45F 5/021; A45F 5/02; Y10T 24/13; Y10T 29/49826
USPC ............... 248/231.81, 221.11, 690, 691, 692, 248/304, 301; 224/268, 197, 272; 24/667
See application file for complete search history.

(56) References Cited

U.S. PATENT DOCUMENTS

| | | | |
|---|---|---|---|
| 4,419,794 A * | 12/1983 | Horton et al. | 24/667 |
| 5,729,869 A * | 3/1998 | Anscher | 24/3.1 |
| 5,743,451 A | 4/1998 | Kahn | |
| 5,850,996 A * | 12/1998 | Liang | 248/221.11 |
| 6,062,449 A | 5/2000 | Kahn | |
| 6,443,342 B1 | 9/2002 | Kahn | |
| 6,454,147 B1 * | 9/2002 | Marks | 224/268 |
| RE38,035 E | 3/2003 | Kahn | |
| 6,641,011 B1 | 11/2003 | Kahn | |
| 6,655,560 B2 | 12/2003 | Kahn | |
| 6,848,605 B2 * | 2/2005 | Dillenberger | 224/670 |
| 6,880,794 B1 | 4/2005 | Kahn | |
| 7,032,791 B2 * | 4/2006 | Stotts | 224/269 |
| 7,959,121 B1 * | 6/2011 | Barnes, Jr. | 248/311.2 |
| 2002/0010983 A1 * | 1/2002 | Lee | 24/3.12 |
| 2003/0047575 A1 | 3/2003 | Enkerlin et al. | |
| 2007/0056999 A1 | 3/2007 | Kahn | |
| 2007/0125819 A1 | 6/2007 | Kahn | |
| 2008/0277546 A1 | 11/2008 | Kahn | |
| 2008/0283701 A1 | 11/2008 | Kahn | |

* cited by examiner

*Primary Examiner* — Anita M King
(74) *Attorney, Agent, or Firm* — Haverstock & Owens LLP (57) ABSTRACT

An item holder includes a hanger and a holder. The hanger includes a hanger body, a protrusion and one or more apertures. The holder includes a holder body, a receiving slot, a securing mechanism, tabs, a holder member and an endpiece. The holder is configured to detachably couple to the hanger. In some embodiments, the securing mechanism includes fingers/wedges which secure the protrusion in place and are released using the tabs. The holder, specifically the holder member, is also configured to hold an item.

22 Claims, 11 Drawing Sheets

ITEM HOLDER

RELATED APPLICATIONS

The present application claims priority to U.S. Provisional Patent Application No. 61/156,340, filed on Feb. 27, 2009, and entitled "ITEM HOLDER" to the same inventors under U.S.C. §119(e). This application incorporates U.S. Provisional Patent Application No. 61/156,340, filed on Feb. 27, 2009, and entitled "ITEM HOLDER" to the same inventors by reference in its entirety.

FIELD OF THE INVENTION

The present invention relates to items, implements and equipment. More specifically, the present invention relates to a device to hold items, implements and equipment.

BACKGROUND OF THE INVENTION

Some workers have jobs that require carrying items while climbing a ladder to access their work site or carrying tools to other hard to access locations such as basements and attics. Belts of various designs have been provided to hold an item while allowing the worker to keep their hands free for climbing. Previous designs include leather or cloth loops which hang from the belt. These belts present certain inconveniences to the worker which limit their usefulness. Since cloth is not a rigid structure, cloth loops close when not in use, making it difficult for the worker to replace the item into the loop with one hand Leather loops have similar problems. Further, loops are not very secure, meaning the item is able to slip out of the loop which could harm a worker below.

SUMMARY OF THE INVENTION

An item holder includes a hanger and a holder. The hanger includes a hanger body, a protrusion and one or more apertures. The holder includes a holder body, a receiving slot, a securing mechanism, tabs, a holder member and an end-piece. The holder is configured to detachably couple to the hanger. In some embodiments, the securing mechanism includes fingers/wedges which secure the protrusion in place and are released using the tabs. The holder, specifically the holder member, is configured to hold an item.

In one aspect, a device comprises a hanger, a body with a securing mechanism including at least one finger, the body configured for coupling to the hanger and a holder member coupled to the body, the holder member configured for receiving an item. The hanger is configured for clipping onto an object. The hanger further comprises a protrusion configured for coupling with the at least one finger. The protrusion comprises at least one of a stem and a head, the stem with a groove or a bulb and the stem. The hanger further comprises at least one aperture for hanging the device on an object. The body further comprises a receiving slot for receiving the protrusion. The body further comprises an one opening mechanism for opening the at least one finger to decouple the hanger from the body. The opening mechanism comprises a tab or a set of tabs. Further comprising an end-piece at the end of the holder member. The holder member is one of a U-shape, a V-shape or a W-shape. The device comprises metal, plastic, rubber, polymers or a combination thereof.

In another aspect, a device comprises a hanger including a protrusion, a body including a receiving slot configured for receiving the protrusion of the hanger, a plurality of fingers configured for receiving and securing a protrusion of the hanger and an opening mechanism for opening the plurality of fingers to release the protrusion and a holder member coupled to the body, the holder member configured for receiving an item. The hanger is configured for clipping onto an object. The protrusion comprises at least one of a stem and a head, the stem with a groove or a bulb and the stem. The hanger further comprises at least one aperture for hanging the device on an object. The opening mechanism comprises a tab or a set of tabs. The device further comprises an end-piece at the end of the holder member. The holder member is one of a U-shape, a V-shape or a W-shape. The device comprises metal, plastic, rubber, polymers or a combination thereof.

In another aspect, a method of utilizing an item holder comprises coupling a holder to a hanger including receiving a protrusion within a receiving slot of the holder, receiving and securing the protrusion within a plurality of fingers and releasing the protrusion using an opening mechanism to open the plurality of fingers, coupling the hanger to an object and placing an item within a holder member of the holder. The object is selected from the group consisting of a belt, a wall, a toolbox, a ladder, a vehicle, a wheeled device, a wheelbarrow, a cart and a vest. The protrusion comprises at least one of a stem and a head, the stem with a groove or a bulb and the stem. The hanger is configured for clipping on the object. The hanger further comprises at least one aperture for hanging the device. The opening mechanism comprises a tab or a set of tabs. The holder further comprises an end-piece at the end of the holder member. The holder member is one of a U-shape, a V-shape or a W-shape. The holder and the hanger comprise metal, plastic, rubber, polymers or a combination thereof.

In another aspect, a method of manufacturing an item holder comprises forming a hanger and forming a holder, wherein forming the holding device further includes constructing a holder body with a receiving slot, a plurality of fingers configured for receiving and securing a protrusion of the hanger, an opening mechanism configured for opening the plurality of fingers and a holder member. Forming the hanger further comprises forming a piece of material, bending the material approximately in the middle of the material with a 180° rounded bend to form a clip, providing a bend near an end of the material and drilling one or more apertures within the material. Forming the holder further comprises inserting the plurality of fingers and the opening mechanism within the holder body, coupling the holder member to the holder body and coupling an end-piece to the holder member. The protrusion comprises at least one of a stem and a head, the stem with a groove or a bulb and the stem. The opening mechanism comprises a tab or a set of tabs. The holder and the hanger comprise metal, plastic, rubber, polymers or a combination thereof.

In another aspect, a device comprises a vest body, a protrusion extending from or coupled to the vest body, a holder with a securing mechanism including at least one finger, the holder configured for coupling to the vest body and a holder member coupled to the holder, the holder member configured for receiving an item. The securing mechanism couples to the protrusion. The at least one finger receives and secures the protrusion.

In another aspect, a device comprises a backpack body, a protrusion extending from or coupled to the backpack body, a holder with a securing mechanism including at least one finger, the holder configured for coupling to the backpack body and a holder member coupled to the holder, the holder member configured for receiving an item. The securing mechanism couples to the protrusion. The at least one finger receives and secures the protrusion.

In another aspect, a device comprises an object, a protrusion extending from or coupled to the object, a holder with a securing mechanism including at least one finger, the holder configured for coupling to the object and a holder member coupled to the holder, the holder member configured for receiving an item. The securing mechanism couples to the protrusion. The at least one finger receives and secures the protrusion. The object is selected from the group consisting of a vest, a backpack, a toolbox, a ladder, a vehicle, a wheeled device, a wheelbarrow, a cart, a wall, a board, a door, a ceiling, a pants and a jacket.

In another aspect, a device comprises a hanging device and a body with a pressure-based securing mechanism comprising a plurality of nodules for securing a first protrusion of the hanging device at least partially within the body and for securing a second protrusion of an item at least partially within the body.

In another aspect, a device comprises a hanging device, a body with a pressure-based securing mechanism comprising a plurality of nodules for securing a protrusion of the hanging device at least partially within the body and a holder member coupled to the body for receiving and securing an item.

In another aspect, a device comprises a belt body, a protrusion extending from or coupled to the belt body, a holder with a securing mechanism including at least one finger, the holder configured for coupling to the backpack body and a holder member coupled to the holder, the holder member configured for receiving an item.

In another aspect, a device comprises a hanging device and a securing mechanism comprising a plurality of arms for securing a protrusion of the hanging device at least partially within the body, wherein the plurality of arms include a first aperture between the plurality of arms for receiving and passing the protrusion through and a second aperture between the plurality of arms for receiving and storing the protrusion.

DETAILED DESCRIPTION

An item holder includes a holder coupled to a hanger such that the holder holds an item and the hanger allows the item holder to be hung on an object.

Figure 1:
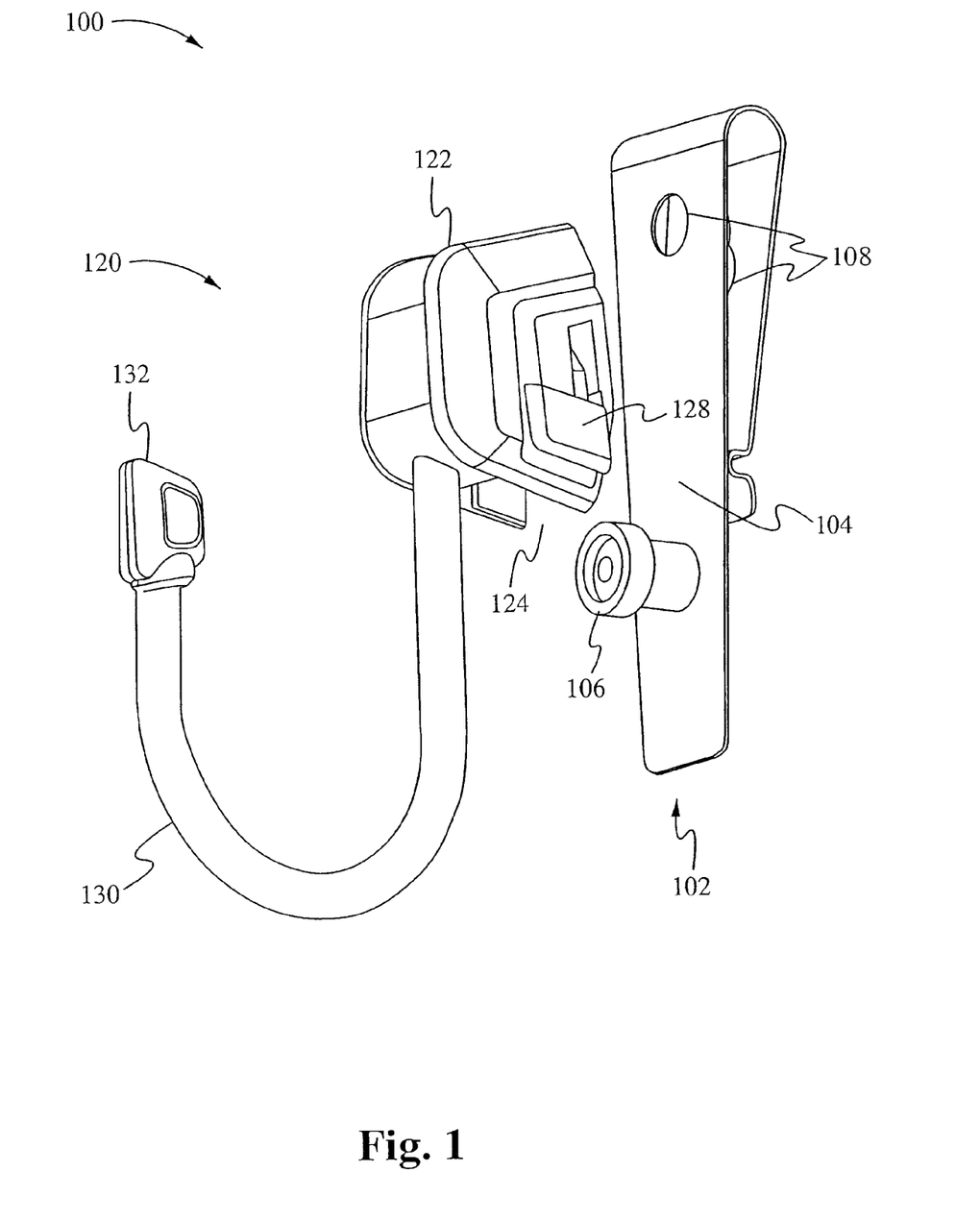
FIG. 1 illustrates a front perspective view of an item holder in accordance with an embodiment.

FIG. 1 illustrates a front perspective view of an item holder 100 in accordance with an embodiment. The item holder 100 includes a hanger 102 and a holder 120. The holder 120 includes a mechanism to couple to the hanger 102.

The hanger 102 includes a hanger body 104, a protrusion 106 and one or more apertures 108. The hanger body 104 is configured in a way to support the holder 120 and hang on an object. In some embodiments, the hanger body 104 includes a bend to form a clip device which is able to clip on an object such as a belt. In embodiments with the hanger body 104 configured as a clip, the bend causes the ends of the hanger body 104 to be biased in a closed configuration so that after an object such as a belt is inserted, the hanger 102 remains on the belt until a user removes the hanger 102. The object such as the belt is inserted into the hanger 102 by pushing the ends of the hanger body 104 against the belt or pushing the belt where the ends of the hanger body 104 are, so that the ends separate enough for the belt to fit and slide in. In some embodiments, the user is able to pull the ends of the hanger body 104 apart and slide the belt into the opening of the hanger body 104. In some embodiments, the hanger body 104 includes a double bend or deep indentation near the end of the hanger body 104 to help maintain a closed clip. The protrusion 106 is configured to couple with a mechanism of the holder 120. In some embodiments, the protrusion 106 is pin-shaped with a stem and a head. In some embodiments, the protrusion 106 includes a stem with a groove and no head, and in some embodiments, a bulb such as a spherical bulb and a stem. In some embodiments, the protrusion 106 has a different shape, but is configured to couple with the mechanism of the holder 120. In some embodiments, the protrusion 106 is part of and extends from the hanger 102, and in some embodiments, the protrusion 106 is coupled to the hanger 102, for example, by a rivet, a screw, a fastener or other object. In some embodiments, the one or more apertures 108 enable the hanger body 104 to be hung on an object such as a wall. In some embodiments, the hanger 102 does not include any apertures.

The holder 120 includes a holder body 122 and a holder member 130. The holder body 122 includes a receiving slot 124 configured for receiving the protrusion 106. The holder body 122 also includes a securing mechanism 126 (FIG. 2) with one or more tabs 128. The securing mechanism 126 (FIG. 2) secures the protrusion 106 within the holder 120. In some embodiments, the securing mechanism 126 (FIG. 2) includes fingers/wedges or another implementation to be able to secure the protrusion 106 within the holder 120. In some embodiments, to decouple the protrusion 106 from the securing mechanism 126 (FIG. 2), the tabs 128 of the securing mechanism 126 (FIG. 2) are able to be pressed which causes the securing mechanism 126 (FIG. 2) to open allowing the protrusion 106 to be removed. In some embodiments, the securing mechanism 126 (FIG. 2) and the tabs 128 are one component, and in some embodiments, they are separate components. The securing mechanism 126 (FIG. 2) is biased in a closed position so that after the protrusion 106 is received, the hanger 102 and the holder 120 are coupled together until they are released. In some embodiments, a spring or other mechanism biases the securing mechanism 126 (FIG. 2) in a closed position. The holder member 130 is coupled to the holder body 122. The holder member 130 is configured so that an item is able to be held on/within the holder member 130. In some embodiments, the holder member 130 is a U-shape or a V-shape. In some embodiments, multiple holder members are coupled to the holder body 122. In some embodiments, an end-piece 132 is included at the end of the holder member 130. The end-piece 132 is able to prevent items from sliding off the end.

Figure 2:
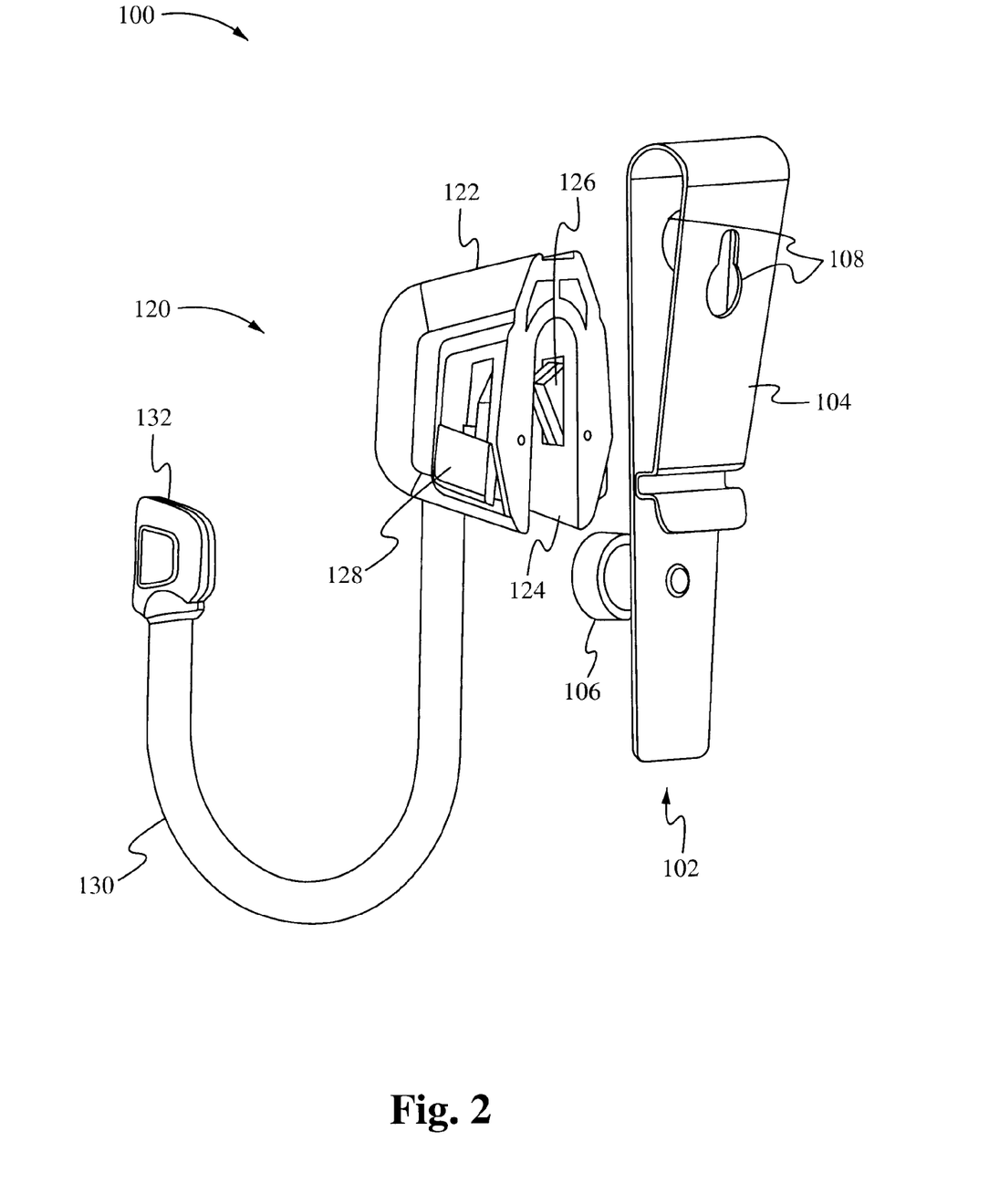
FIG. 2 illustrates a back perspective view of an item holder in accordance with an embodiment.

FIG. 2 illustrates a back perspective view of an item holder 100 in accordance with an embodiment. As described above, the item holder 100 includes a hanger 102 and a holder 120. The hanger 102 includes a hanger body 104, a protrusion 106 and one or more apertures 108. The hanger 102 is configured to couple to the holder 120 and also to an object such as a wall, a belt, a vest, a toolbox, a ladder, a vehicle, a wheeled device such as a wheelbarrow or a cart, another article of clothing or another item. The holder 120 includes a holder body 122, a receiving slot 124, a securing mechanism 126, tabs 128, a holder member 130 and an end-piece 132. The holder 120 is configured to detachably couple to the hanger 102. The holder 120, specifically the holder member 130, is also configured to hold item(s) such as extension cords, rope, implements for performing tasks, sports equipment or another device. The sports equipment includes items such as fishing equipment, hunting equipment or other objects. In some embodiments, when the holder 120 and the hanger 102 are coupled together, the holder 120 is able to spin and/or rotate to provide better access to the item(s) being held. When the holder 120 rotates, the item(s) being held remain on the holder 120 and do not fall off/out. In some embodiments, the holder member 130 is able to rotate around the holder body 122 to allow the holder member 130 to be configured in an out, forward, or back position relative to the side of the user's hip.

Figure 3:
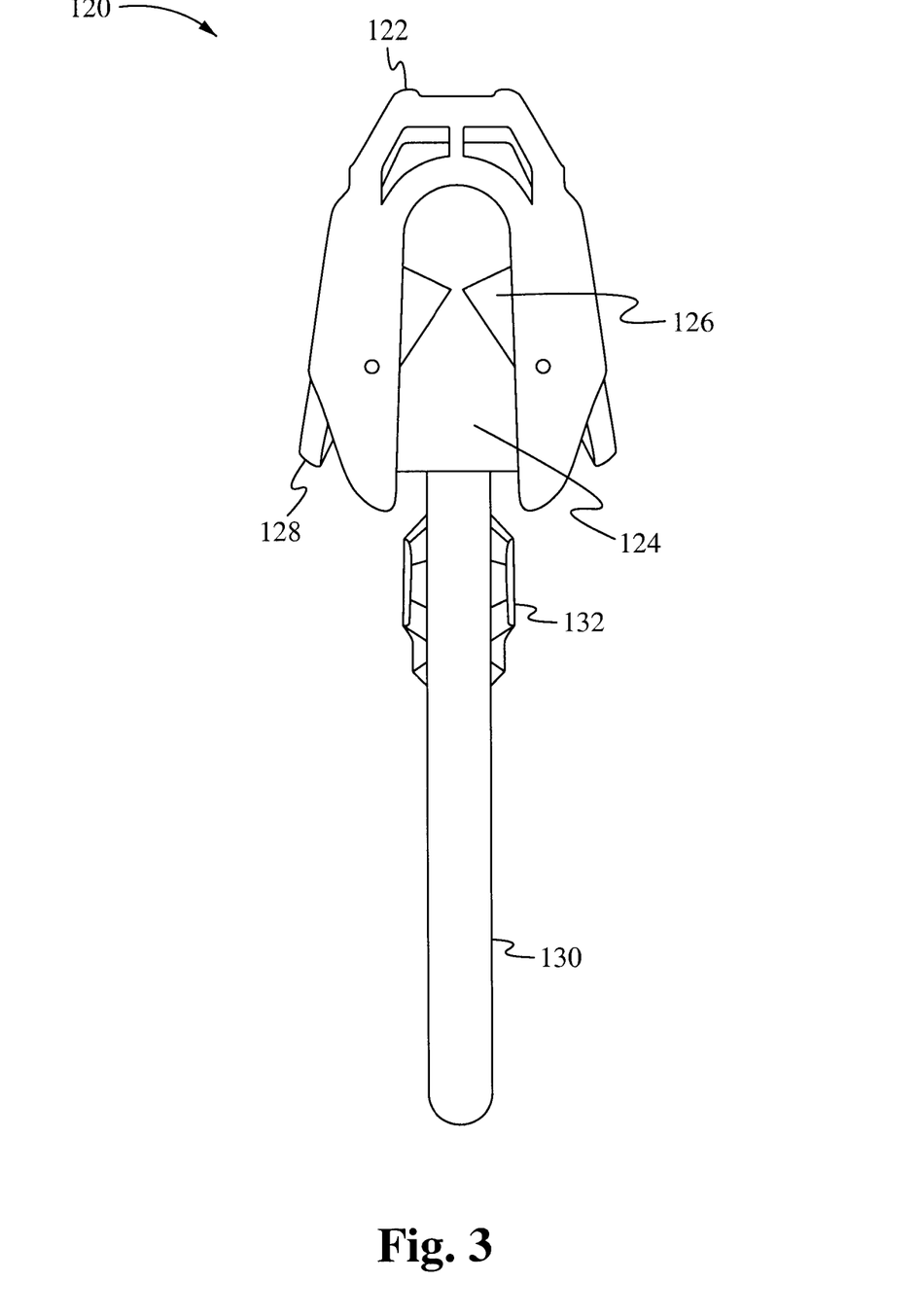
FIG. 3 illustrates a back view of a holder in accordance with an embodiment.

FIG. 3 illustrates a back view of a holder 120 in accordance with an embodiment. As described above, the holder 120 includes a holder body 122, a receiving slot 124, a securing mechanism 126, tabs 128, a holder member 130 and an end-piece 132. The receiving slot 124 is sized appropriately to receive a protrusion 106 (FIG. 2) of a hanger 102 (FIG. 2). Additionally, to securely couple the protrusion 106 (FIG. 2) with the holder body 122, the securing mechanism 126 receives the protrusion 106 (FIG. 2). In some embodiments, the protrusion 106 (FIG. 2) slides within the receiving slot 124 and pushes the securing mechanism 126 apart temporarily with the securing mechanism 126 closing after the protrusion 106 (FIG. 2) passes beyond the securing mechanism 126. In some embodiments, to open the securing mechanism 126 to release the protrusion 106 (FIG. 2), one or more tabs 128 are used. In some embodiments, the securing mechanism 126 is biased in a closed position. In some embodiments, the securing mechanism 126 is biased in a closed position by a device such as a spring, and the tabs 128 are able to be used to overcome the bias to open the securing mechanism and release the protrusion 106 (FIG. 2).

Figure 4:
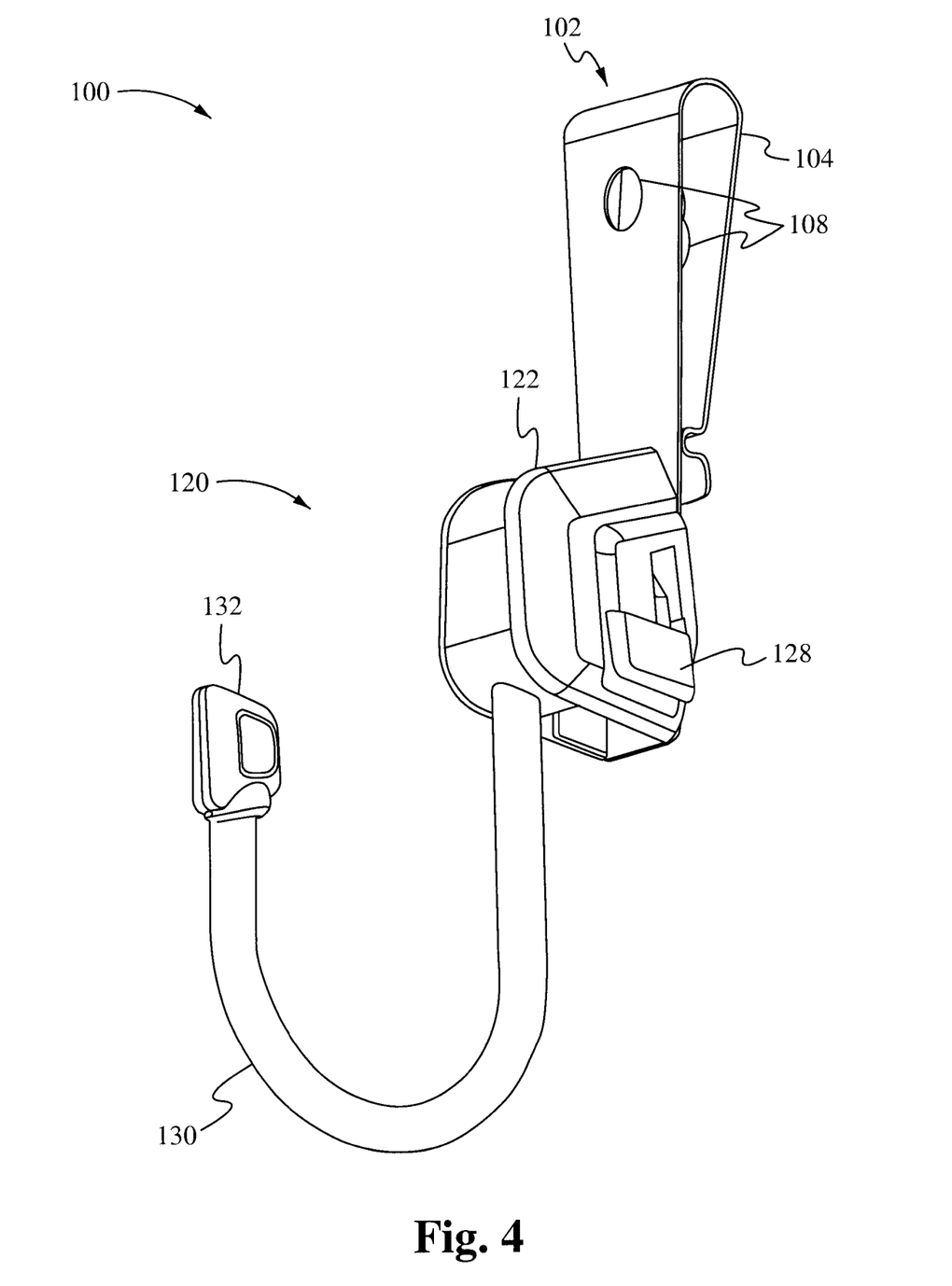
FIG. 4 illustrates a front perspective view of an assembled item holder in accordance with an embodiment.

FIG. 4 illustrates a front perspective view of an assembled item holder 100 in accordance with an embodiment. After the holder 120 is coupled with the hanger 102, the item holder 100 is an assembled item holder 100. As described above, the holder 120 and the hanger 102 are coupled together using the securing mechanism 126 and the protrusion 106. Specifically, in some embodiments, the securing mechanism 126 is slid onto the protrusion 106, or the protrusion 106 is slid into the securing mechanism 126. Once assembled, the item holder 100 is able to be coupled to an object such as a wall, a belt, a vest, a toolbox, a ladder, a vehicle, a wheeled device such as a wheelbarrow or a cart, another article of clothing or another item. Additionally, the holder 120, specifically the holder member 130, is also able to hold an item. In some embodiments, when the holder 120 and the hanger 102 are coupled, the holder 120 is able to spin and/or rotate to provide better access to the items being held.

Figure 5:
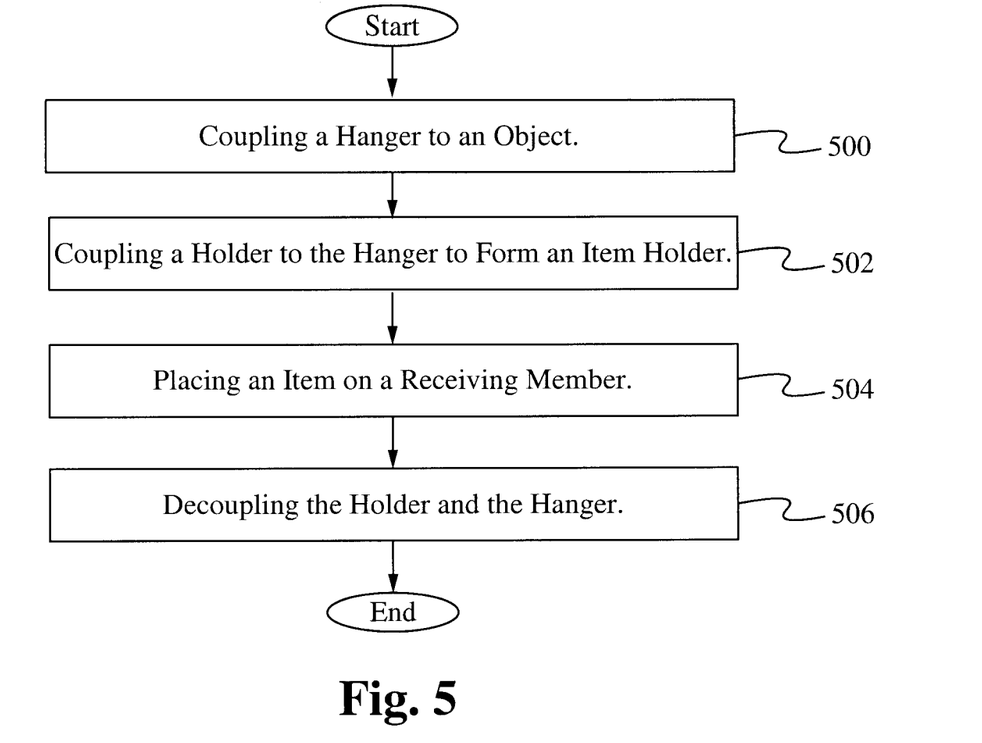
FIG. 5 illustrates a flowchart of a method of utilizing the item holder in accordance with an embodiment.

FIG. 5 illustrates a flowchart of utilizing the item holder in accordance with an embodiment. In the step 500, the hanger is coupled to an object such as a wall, belt, vest, toolbox, a ladder, vehicle, a wheeled device such as a wheelbarrow or a cart or another article of clothing or another item. The method of coupling the hanger to the object depends on the object. For a belt, the hanger is coupled to the belt by clipping the hanger on the belt. For a wall, the hanger is hung on a nail, screw or similar object. In the step 502, the holder is coupled to the hanger. The holder is coupled to the hanger using the securing mechanism and a protrusion, where the protrusion is received by the securing mechanism. In some embodiments, coupling the hanger to the securing mechanism includes receiving the protrusion within a receiving slot of the holder, receiving and securing the protrusion within the securing mechanism such as a plurality of fingers and releasing the protrusion using an opening mechanism such as tabs to open the plurality of fingers. In some embodiments, the steps 500 and 502 are reversed. Once the item holder is assembled and coupled to a desired object, a user is able to place an item on the holder member of the item holder, in the step 504. With the item positioned in the holder member, the user is able to move around with hands free. The user is able to utilize the item as desired such as taking it to perform work and then replacing the item when not using it. Since the holder is rotatable, the item is easily accessible while held within the holder member. Once the user is finished with the item, the user is able to remove the item from the holder member. When the user chooses to disassemble the item holder, tabs of the securing mechanism are pressed, thus opening the securing mechanism, and the holder is lifted away from the protrusion, in the step 506.

Figure 6:
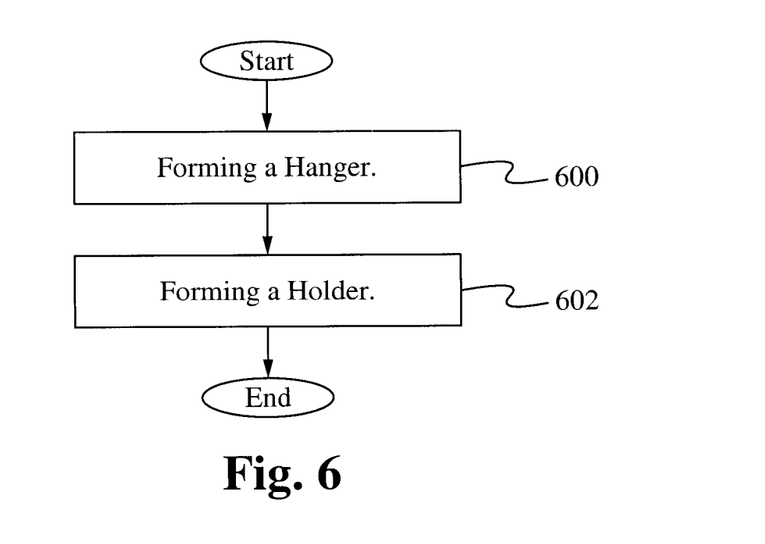
FIG. 6 illustrates a flowchart of a method of manufacturing an item holder in accordance with an embodiment.

FIG. 6 illustrates a flowchart of manufacturing an item holder in accordance with an embodiment. In the step 600, a hanger is formed. In some embodiments, forming the hanger includes forming a piece of material, bending the material approximately in the middle of the material with a 180° rounded bend to form a clip, providing a double or quadruple bend near the end of the material and drilling one or more apertures within the material. In some embodiments, the hanger is formed in a mold. In the step 602, a holder is formed. In some embodiments, forming the holder includes constructing a holder body with a receiving slot, a securing mechanism, tabs, a holder member and an end-piece. In some embodiments, forming the holder also includes inserting, or at least partially inserting, the securing mechanism and the tabs within the holder body, coupling the holder member to the holder body and coupling the end-piece to the holder member. In some embodiments, the end-piece is formed as part of the holder member. In some embodiments, the holder member does not include an end-piece. In some embodiments, a retainer (also referred to as a push-nut) rather than a regular nut, is used to couple the holder member to the holder body. The retainer is pressed over an un-threaded shaft and captures and retains the shaft. In some embodiments, a pocket is included on the holder body (such as the front of the holder body) that is able to accept items such as the retainer and an elastomeric washer. For example, the retainer and washer are placed in the pocket and then the holder member end is pressed up through the central body hole and assembly is complete. Using such an assembly, the hanger is able to hold 50 pounds of items using a 0.25' aluminum shaft. In some embodiments, the retainer is a TruArc 5105-25 Clip retainer. Although specific implementations are described, similar methods of manufacturing are possible.

Figure 7:
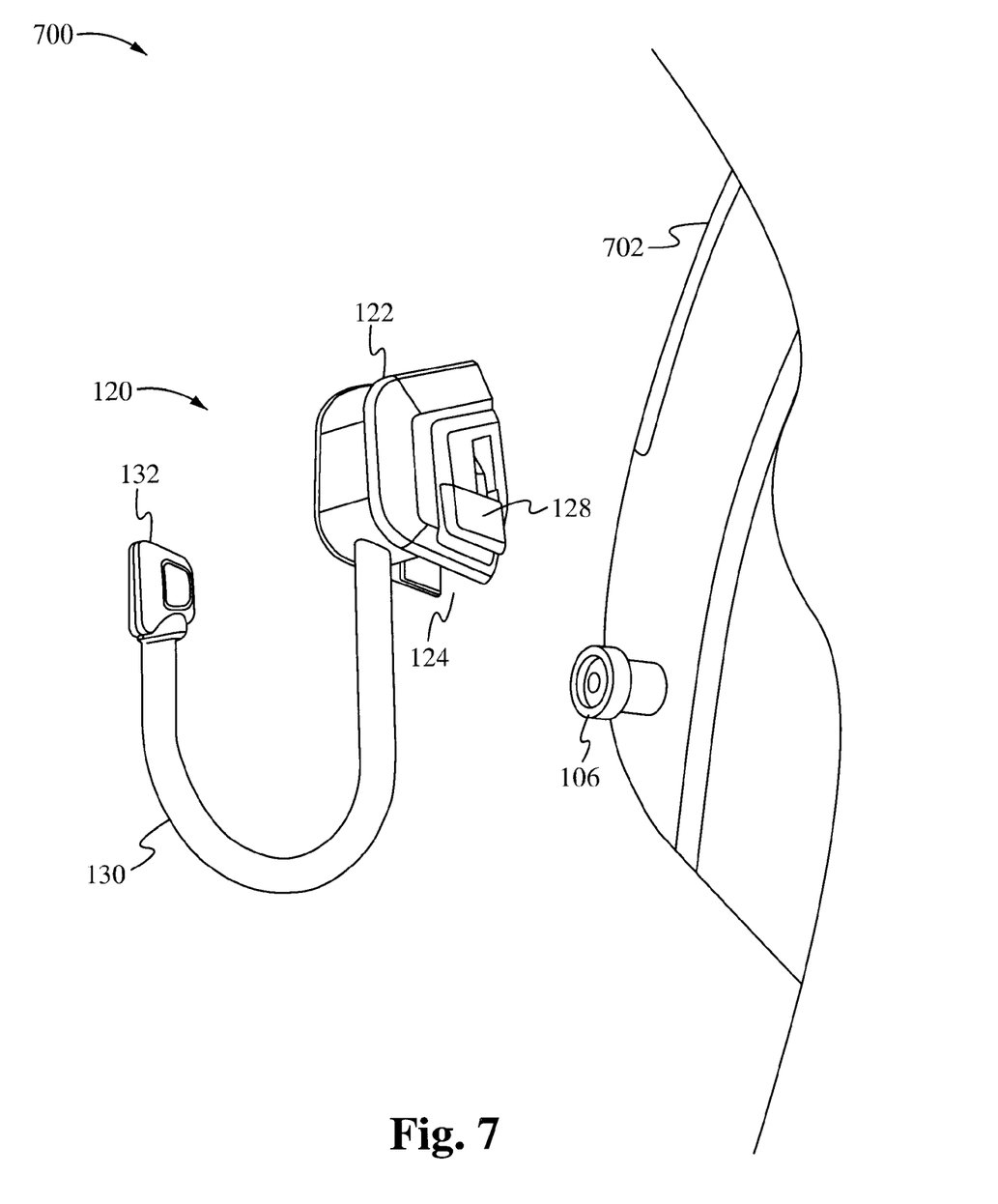
FIG. 7 illustrates a front perspective view of an item holder in accordance with an embodiment.

FIG. 7 illustrates a front perspective view of an item holder 700 in accordance with an embodiment. The item holder 700 includes a holder 120 and a backpack 702 with one or more protrusion(s) 106. The holder 120 includes a mechanism to couple to the backpack 702.

The backpack 702 includes one or more protrusion(s) 106. The backpack 702 and protrusion 106 are configured in a way to support the holder 120 and hang. In some embodiments, the backpack 702 is a standard backpack with a protrusion 106 coupled to the backpack. In some embodiments, the backpack 702 is a specially designed backpack. The protrusion 106 is configured to couple with a mechanism of the holder 120. In some embodiments, the protrusion 106 is pin-shaped with a stem and a head. In some embodiments, the protrusion 106 has a different shape, but is configured to couple with the mechanism of the holder 120. In some embodiments, the protrusion 106 is part of and extends from the backpack 702, and in some embodiments, the protrusion 106 is coupled to the backpack 702, for example, by a rivet, screw or other object. The protrusion 106 is able to be located anywhere on the backpack, for example, on one or both of the shoulder straps or on the upper, middle or lower portion of the back of the backpack.

The holder 120 includes a holder body 122 and a holder member 130. The holder body 122 includes a receiving slot 124 configured for receiving the protrusion 106. The holder body 122 also includes a securing mechanism 126 (FIG. 2) with tabs 128. The securing mechanism 126 (FIG. 2) secures the protrusion 106 within the holder 120. In some embodiments, the securing mechanism 126 (FIG. 2) includes fingers/wedges or another implementation to be able to secure the protrusion 106 within the holder 120. In some embodiments, to decouple the protrusion 106 from the securing mechanism 126 (FIG. 2), the tabs 128 of the securing mechanism 126 (FIG. 2) are able to be pressed which causes the securing mechanism 126 (FIG. 2) to open allowing the protrusion 106 to be removed. In some embodiments, the securing mechanism 126 (FIG. 2) and the tabs 128 are one component, and in some embodiments, they are separate components. The securing mechanism 126 (FIG. 2) is biased in a closed position so that after the protrusion 106 is received, the backpack 702 and the holder 120 are coupled together until they are released. In some embodiments, a spring or other mechanism biases the securing mechanism 126 (FIG. 2) in a closed position. The holder member 130 is coupled to the holder body 122. The holder member 130 is configured so that an item is able to be held on/within the holder member 130. In some embodiments, the holder member 130 is a U-shape or a V-shape. In some embodiments, multiple holder members are coupled to the holder body 122. In some embodiments, an end-piece 132 is included at the end of the holder member 130. The end-piece 132 is able to prevent items from sliding off the end.

The method of manufacturing the item holder 700 is similar to the method as described above, except a backpack is constructed and one or more protrusions are coupled to the backpack.

Figure 8:
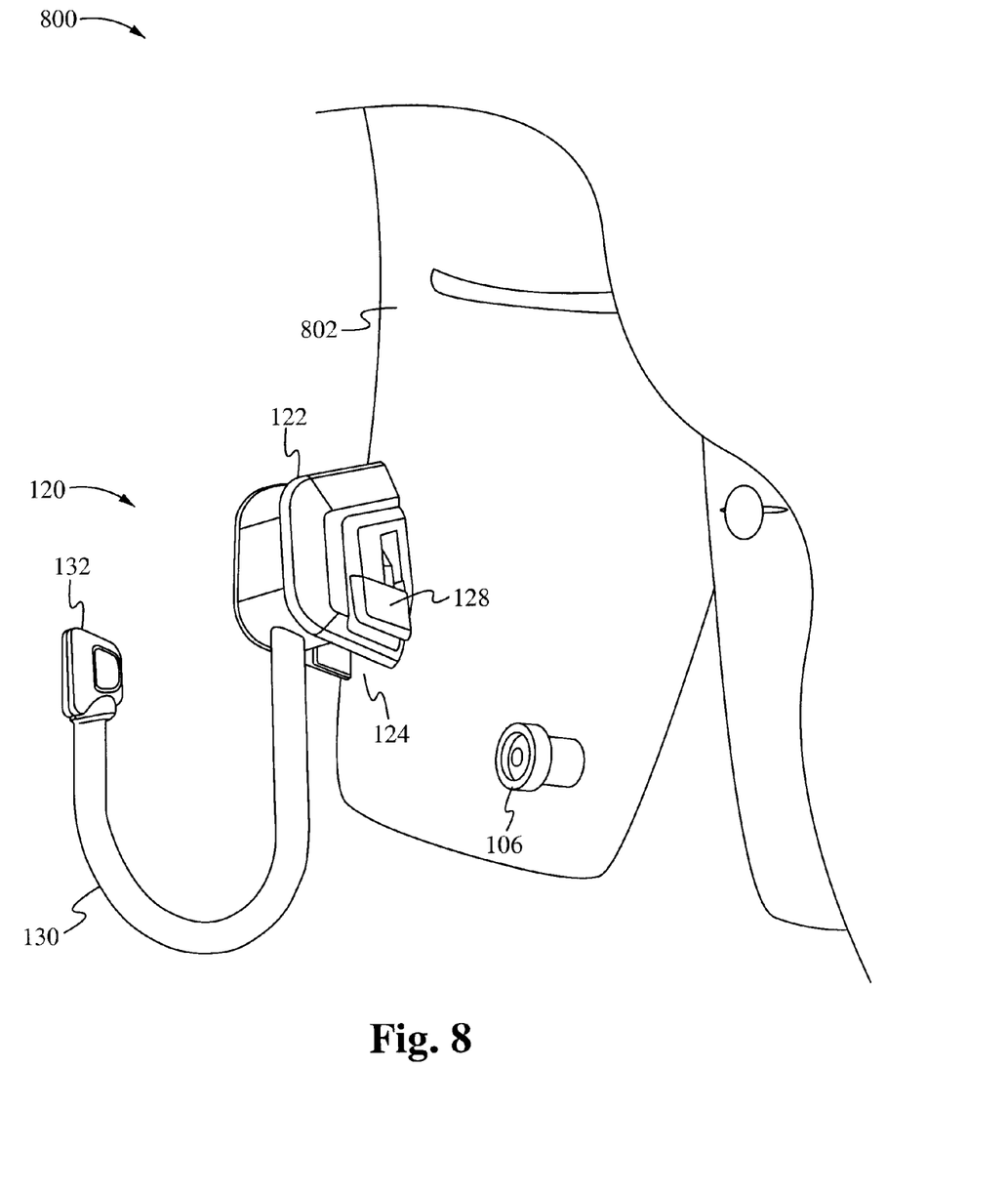
FIG. 8 illustrates a front perspective view of an item holder in accordance with an embodiment.

FIG. 8 illustrates a front perspective view of an item holder 800 in accordance with an embodiment. The item holder 800 includes a holder 120 and a vest 802 with one or more protrusions 106. The holder 120 includes a mechanism to couple to the vest 802.

The vest 802 includes one or more protrusions 106. The vest 802 and protrusion 106 are configured in a way to support the holder 120 and hang. In some embodiments, the vest 802 is a standard backpack with one or more protrusions 106 coupled to the vest. In some embodiments, the vest 802 is a specially designed backpack. The protrusion 106 is configured to couple with a mechanism of the holder 120. In some embodiments, the protrusion 106 is pin-shaped with a stem and a head. In some embodiments, the protrusion 106 has a different shape, but is configured to couple with the mechanism of the holder 120. In some embodiments, the protrusion 106 is part of and extends from the vest 802, and in some embodiments, the protrusion 106 is coupled to the vest 802, for example, by a rivet, screw or other object. The protrusion 106 is able to be located anywhere on the vest such as on the front or the back (upper, middle or lower sections).

The holder 120 includes a holder body 122 and a holder member 130. The holder body 122 includes a receiving slot 124 configured for receiving the protrusion 106. The holder body 122 also includes a securing mechanism 126 (FIG. 2) with tabs 128. The securing mechanism 126 (FIG. 2) secures the protrusion 106 within the holder 120. In some embodiments, the securing mechanism 126 (FIG. 2) includes fingers/wedges or another implementation to be able to secure the protrusion 106 within the holder 120. In some embodiments, to decouple the protrusion 106 from the securing mechanism 126 (FIG. 2), the tabs 128 of the securing mechanism 126 (FIG. 2) are able to be pressed which causes the securing mechanism 126 (FIG. 2) to open allowing the protrusion 106 to be removed. In some embodiments, the securing mechanism 126 (FIG. 2) and the tabs 128 are one component, and in some embodiments, they are separate components. The securing mechanism 126 (FIG. 2) is biased in a closed position so that after the protrusion 106 is received, the vest 802 and the holder 120 are coupled together until they are released. In some embodiments, a spring or other mechanism biases the securing mechanism 126 (FIG. 2) in a closed position. The holder member 130 is coupled to the holder body 122. The holder member 130 is configured so that an item is able to be held on/within the holder member 130. In some embodiments, the holder member 130 is a U-shape or a V-shape. In some embodiments, multiple holder members are coupled to the holder body 122. In some embodiments, an end-piece 132 is included at the end of the holder member 130. The end-piece 132 is able to prevent items from sliding off the end.

Although the object shown in FIG. 8 is a portion of a vest, a similar implementation is able to exist for other articles of clothing such as a belt, jacket or pants. Further, in some embodiments, the protrusion(s) are able to be spaced evenly or unevenly on the object such as several locations two inches apart on a belt.

The method of manufacturing the item holder 800 is similar to the method as described above, except a vest is constructed and a protrusion is coupled to the vest.

The protrusion is able to be positioned on any object such as a toolbox, vehicle, wheeled device such as a wheelbarrow, a cart, wall, ladder, board, door, ceiling, pants, jacket, other clothing or other objects.

Figure 9:
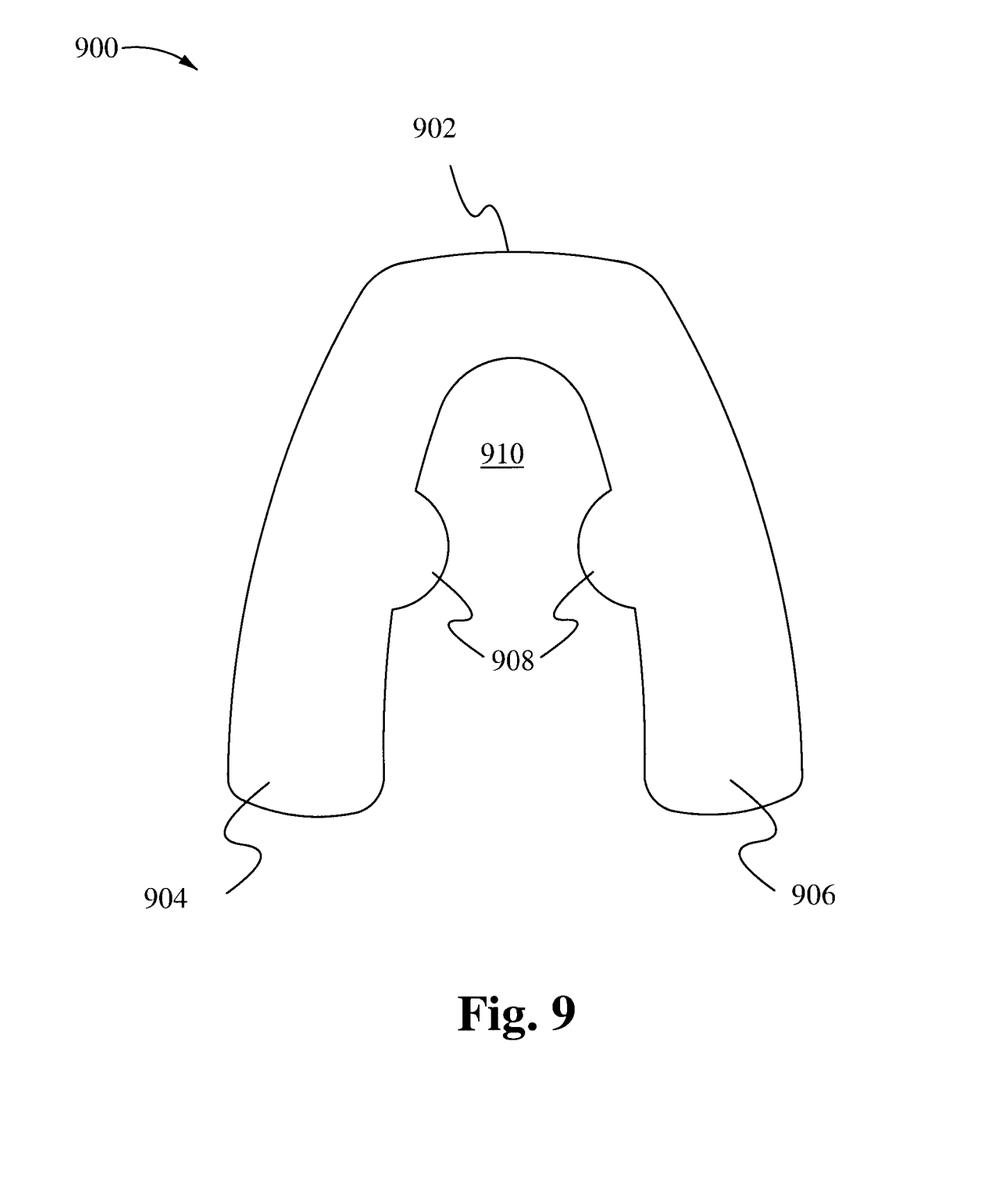
FIG. 9 illustrates a front view of a pressure-based securing mechanism in accordance with an embodiment.

FIG. 9 illustrates a front view of a pressure-based securing mechanism 900 in accordance with an embodiment. The pressure-based securing mechanism 900 includes a body 902 with a first arm 904, a second arm 906 and one or more inner nodules 908, forming a clip. The pressure-based securing mechanism 900 is formed so that the first arm 904 and the second arm 906 are able to be slightly separated outwardly by force and then based on a pressure-retraction-action, the first arm 904 and the second arm 906 close at least partially around an object. For example, the pressure-based securing mechanism 900 is coupled to a protrusion 106 (FIG. 1) by positioning the protrusion 106 (FIG. 1) between the first arm 904 and the second arm 906 and pushing the pressure-based securing mechanism 900 so that the protrusion 106 (FIG. 1) slightly pushes the inner nodules 908 which pushes the first arm 904 and the second arm 906 open, allowing the protrusion 106 (FIG. 1) to be received within an aperture 910 beyond the inner nodules 908.

Figure 10:
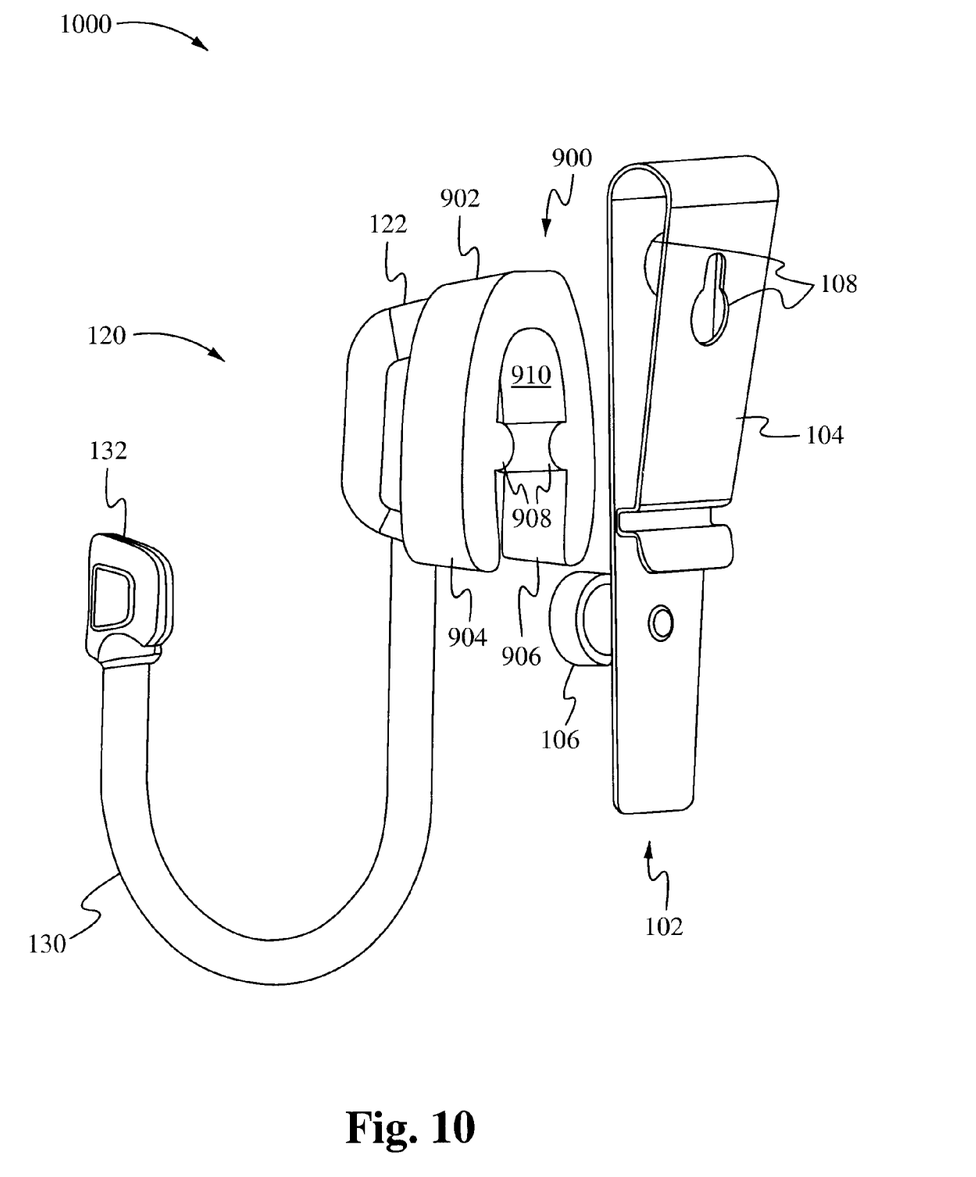
FIG. 10 illustrates a back perspective view of an item holder in accordance with an embodiment.

FIG. 10 illustrates a back perspective view of an item holder 1000 in accordance with an embodiment. The item holder 1000 is similar to the item holder 100 described above, with an exception of including a pressure-based securing mechanism 900. The item holder 1000 includes a hanger 102 and a holder 120. The hanger 102 includes a hanger body 104, a protrusion 106 and one or more apertures 108. The hanger 102 is configured to couple to the holder 120 and also to an object such as a wall, a belt, a vest, a toolbox, a vehicle, a wheeled device such as a wheelbarrow or a cart or another object. The holder 120 includes a holder body 122 and the pressure-based securing mechanism 900 described above. The holder 120 is configured to detachably couple to the hanger 102. The holder 120, specifically the holder member 130, is also configured to hold item(s) such as extension cords, rope, implements for performing tasks, sports equipment or another device. The sports equipment includes items such as fishing equipment, hunting equipment or other objects. In some embodiments, when the holder 120 and the hanger 102 are coupled together, the holder 120 is able to spin and/or rotate to provide better access to the item(s) being held.

Figure 11:
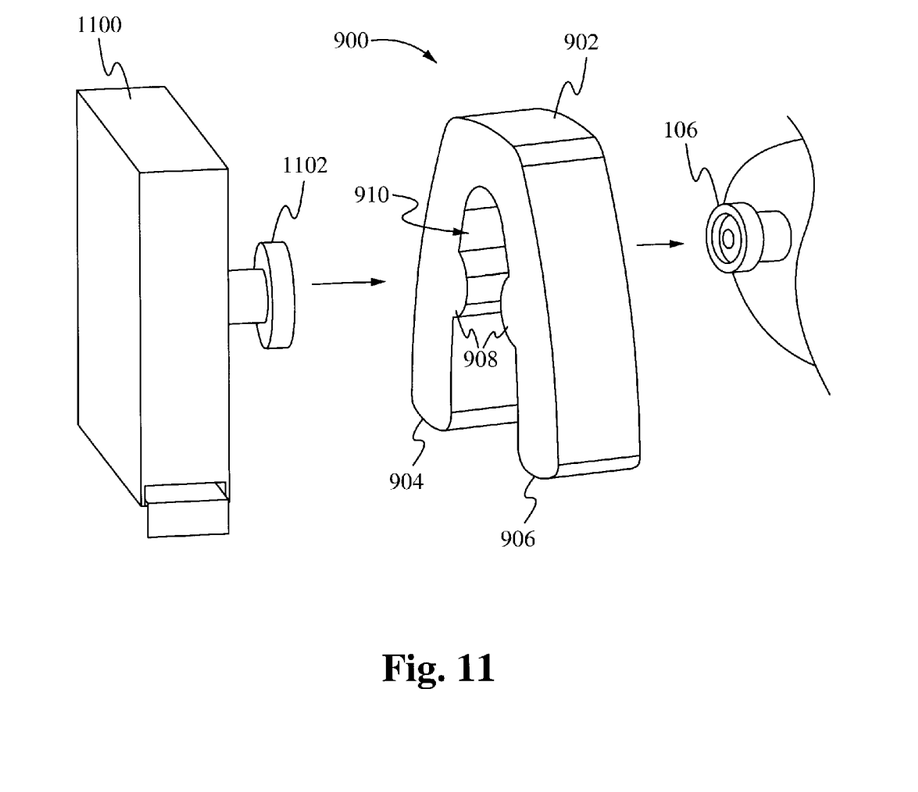
FIG. 11 illustrates a perspective view of an item holder with a tape measure in accordance with an embodiment.

FIG. 11 illustrates a perspective view of a pressure-based securing mechanism 900 with a tape measure 1100 in accordance with an embodiment. As described above, the pressure-based securing mechanism 900 includes a body 902 with a first arm 904, a second arm 906 and inner nodules 908, forming a clip. The pressure-based securing mechanism 900 is able to receive an object such as the tape measure 1100. For example, the tape measure 1100 includes a protrusion 1102 that is configured to detachably couple to the pressure-based securing mechanism 900 from a side. The pressure-based securing mechanism 900 is also configured to detachably couple to a protrusion 106 of another object such as a hanger, a vest, a tool belt or any other object, from another side.

The pressure-based securing mechanism is able to be composed of any material including, but not limited to metal (e.g. steel), plastic, rubber, polymers, or any combination thereof.

Figure 12:
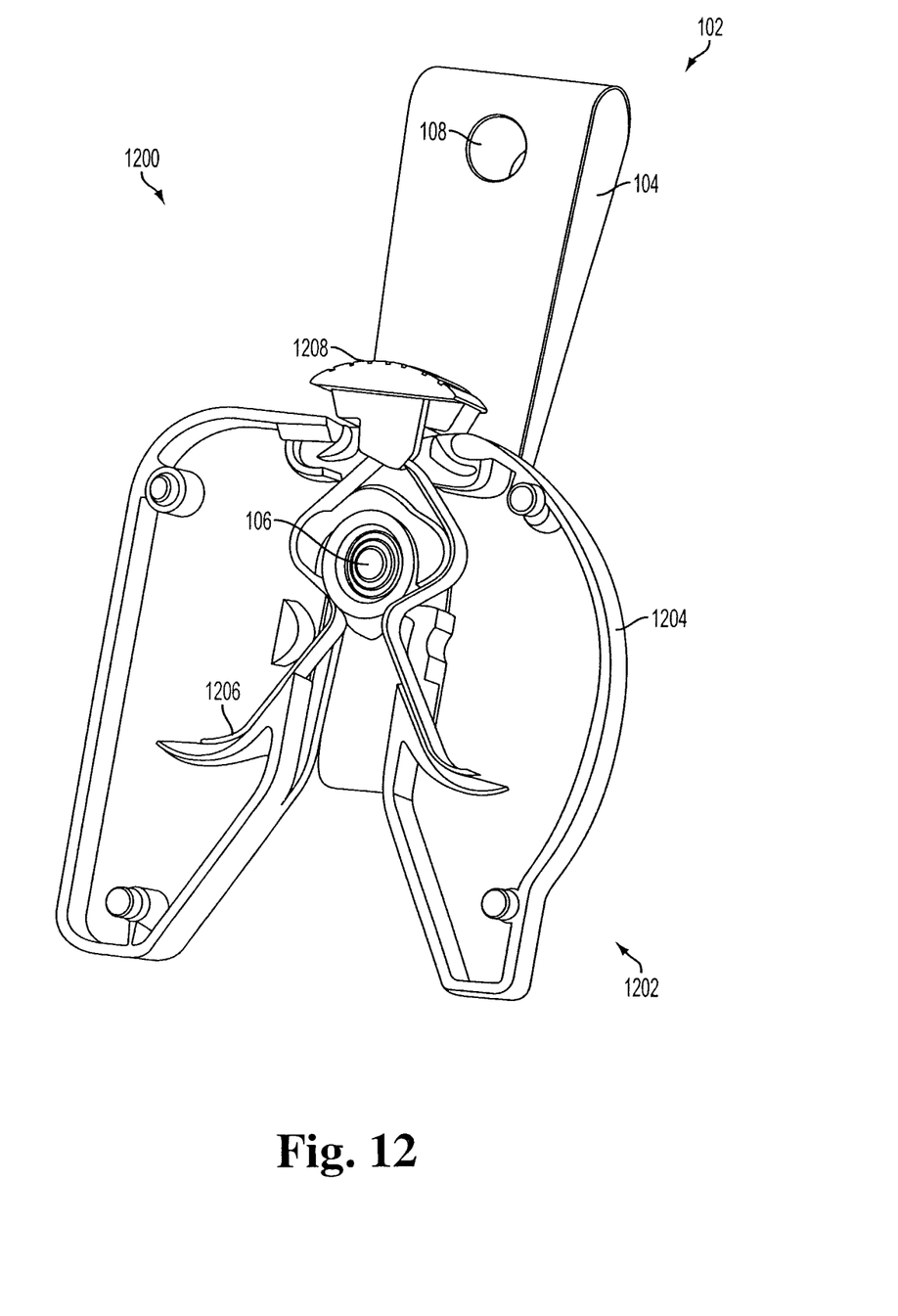
FIG. 12 illustrates a perspective view of an item holder including internal aspects in accordance with an embodiment.

FIG. 12 illustrates a perspective view of an item holder 1200 including internal aspects in accordance with an embodiment. The item holder 1200 includes a hanger 102 and a securing mechanism 1202. The hanger 102 includes a hanger body 104, a protrusion 106 and one or more apertures 108. The hanger 102 is configured to couple to the securing mechanism 1202 and also to an object such as a wall, a belt, a vest, a toolbox, a vehicle, a wheeled device such as a wheelbarrow or a cart or another object. The securing mechanism 1202 includes a body 1204 and one or more arms 1206. The securing mechanism 1202 is configured to detachably couple to the hanger 102. The securing mechanism 1202, specifically the arms 1206, are configured to couple to the protrusion 106 based on a shapely fit, so that the protrusion 106 enters within a narrow opening at a bend of the arms 1206 and then is contained within a shaped opening between the arms 1206. In some embodiments, the arms 1206 include a bend inward towards each other and a bend outward away from each other, wherein the bend inward generates the narrow opening and the bend outward generates the shaped opening for storing the protrusion. The securing mechanism 1202 includes a button 1208 or a set of buttons configured for applying a force to open the arms 1206, which releases the item. In some embodiments, pushing the button 1208, applies a force on the arms 1206 which push against the body 1202 which is configured to open the arms 1206. In some embodiments, the arms 1206 move in and out of the entry/exit slots within the body 1204 when the user presses the button 1208. In some embodiments, the body 1204 includes slots, grooves, gaps, and/or other configurations to receive the arms 1206.

The item holder is able to be composed of any material including, but not limited to, metal (e.g. steel), plastic, rubber, polymers, or any combination thereof. In some embodiments, the holder member is rigid, and in some embodiments, the holder member is flexible.

The item holder described above is an example of some embodiments. However, the item holder is able to be any shape or size. In some embodiments, the holder member is U-shaped, V-shaped, W-shaped, rounded and/or not rounded. In some embodiments, the end-piece is shaped differently, such as a hook. In some embodiments, the holder body is shaped differently. In some embodiments, the tabs are a different implementation, for example, the tabs are buttons. In some embodiments, the securing mechanism is one finger/wedge or another implementation for securing the holder to the hanger. In some embodiments, the hanger is shaped differently, for example, the hanger is able to have a flat structure with no bend. In some embodiments, the hanger does not have any apertures. In some embodiments, the hanger is implemented similar to a carabiner. In some embodiments, the hanger is implemented similar to other hanging or clipping devices. In some embodiments, the protrusion is shaped differently. In some embodiments, instead of using a protrusion, the holder and hanger are coupled with another mechanism or manner. In some embodiments, additional mechanisms are implemented to ensure the item does not fall off of/out of the holder member.

To utilize the item holder, if the holder and the hanger are not already coupled together, then they are coupled together. Then, a user positions the item holder in a desired location such as on the user's item belt. The user then positions an item within the holder member of the item holder so that the user has both hands available. The user is then able to access the item when desired, including rotating the holder so that reaching the item is easier. If the user chooses to replace the holder or the hanger or chooses to decouple the item holder for any other reason, the user is able to, by configuring the securing mechanism to an open position and separating the holder and the hanger, such as by pushing tabs and sliding the protrusion out of the securing mechanism and the receiving aperture.

In operation, the item holder enables a user to carry items without the use of his/her hands. Further, the structure of the item holder helps maintain a secure hold of the item. By being able to rotate, the item holder provides easy access to the item. The item holder provides easy coupling and decoupling of the body to the hanger using a securing mechanism with tabs which receive a protrusion of the hanger. The item holder is also able to be used to store items on a wall, vehicle or elsewhere.

The U.S. Design patent application Ser. No. 29/332,976, filed Feb. 27, 2009, entitled, ITEM HOLDER, is incorporated by reference herein.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

We claim:

1. A device comprising:
   a. a hanging device having a protrusion for receiving a body extending from a first side of the hanging device, a clip and one or more apertures on a second opposite side of the hanging device, the clip for hanging the hanging device on a first object and the one or more apertures for removably hanging the hanging device on a second object different from the first object;
   b. the body with a receiving slot, which is slid over and covers a top of the protrusion of the hanging device in order to removably couple with the hanging device and comprising a securing mechanism including at least one finger, the body configured for coupling to the hanging device, wherein the protrusion is configured for coupling with the at least one finger; and
   c. a u-shaped holder member coupled to the body, the holder member configured for receiving an item.

2. The device of claim 1 wherein the protrusion comprises a stem and a head.

3. The device of claim 1 wherein the receiving slot receives the protrusion.

4. The device of claim 1 wherein the body further comprises an opening mechanism for opening the at least one finger to decouple the hanging device from the body.

5. The device of claim 4 wherein the opening mechanism comprises a set of tabs.

6. The device of claim 1 further comprising an end-piece at the end of the holder member.

7. The device of claim 1 wherein the device comprises metal, plastic, rubber, polymers or a combination thereof.

8. A device comprising:
   a. a hanging device including a protrusion extending from a first side of the hanging device, and for receiving a body, a clip and one or more apertures on a second opposite side of the hanging device, the clip for hanging the hanging device on a first object and the one or more apertures for removably hanging the hanging device on a second object different from the first object;
   b. the body including:
      i. a receiving slot, which is slid over and covers a top of the protrusion of the hanging device in order to removably couple with the hanging device;
      ii. a plurality of fingers configured for receiving and securing the protrusion of the hanging device; and
      iii. an opening mechanism for opening the plurality of fingers to release the protrusion; and
   c. a holder member coupled to the body, the holder member configured for receiving an item.

9. The device of claim 8 wherein the protrusion comprises a stem and a head.

10. The device of claim 8 wherein the opening mechanism comprises a set of tabs.

11. The device of claim 8 further comprising an end-piece at the end of the holder member.

12. The device of claim 8 wherein the holder member is one of a U-shape, a V-shape or a W-shape.

13. The device of claim 8 wherein the device comprises metal, plastic, rubber, polymers or a combination thereof.

14. A method of utilizing an item holder comprising:
   a. coupling a holder to a hanger including:
      i. receiving a protrusion within a receiving slot of the holder by sliding the receiving slot over and covers a top of the protrusion;
      ii. receiving and securing the protrusion within a plurality of fingers; and
      iii. releasing the protrusion using an opening mechanism to open the plurality of fingers;
   b. hanging the hanger on one of a first object and a second different object using one of a clip and one or more apertures wherein the clip and one or more apertures are on an opposite side of the hanger from the protrusion; and
   c. placing an item onto a u-shaped holder member of the holder.

15. The method of claim 14 wherein the object is selected from the group consisting of a belt, a wall, a toolbox, a vehicle, a wheeled device, a wheelbarrow, a cart and a vest.

16. The method of claim 14 wherein the protrusion comprises a stem and a head.

17. The method of claim 14 wherein the opening mechanism comprises a set of tabs.

18. The method of claim 14 wherein the holder further comprises an end-piece at the end of the holder member.

19. The method of claim 14 wherein the holder and the hanger comprise metal, plastic, rubber, polymers or a combination thereof.

20. A device comprising:
   a. an object comprising a clip and one or apertures for hanging the object on an additional surface;
   b. a protrusion extending from the object and on an opposite side from the clip and the one or more apertures;
   c. a holder with a securing mechanism including at least one finger, wherein the securing mechanism couples to the protrusion, and further wherein the holder is slid over a top of the protrusion in order to removably couple with the object; and
   d. a holder member coupled to the holder, the holder member configured for receiving an item.

21. The device of claim 20 wherein the at least one finger receives and secures the protrusion.

22. The device of claim 20 wherein the object is selected from the group consisting of a vest, a backpack, a toolbox, a vehicle, a wheeled device, a wheelbarrow, a cart, a wall, a board, a door, a ceiling, a pants and a jacket.

* * * * *